United States Patent
Hsu

(10) Patent No.: US 9,628,698 B2
(45) Date of Patent: Apr. 18, 2017

(54) GESTURE RECOGNITION SYSTEM AND GESTURE RECOGNITION METHOD BASED ON SHARPNESS VALUES

(71) Applicant: PixArt Imaging Inc, Hsin-Chu (TW)

(72) Inventor: En-Feng Hsu, Hsin-Chu (TW)

(73) Assignee: Pixart Imaging Inc., Hsin-Chu (TW)

( * ) Notice: Subject to any disclaimer, the term of this patent is extended or adjusted under 35 U.S.C. 154(b) by 113 days.

(21) Appl. No.: 13/961,558

(22) Filed: Aug. 7, 2013

(65) Prior Publication Data

US 2013/0321662 A1 Dec. 5, 2013
US 2016/0028943 A9 Jan. 28, 2016

(30) Foreign Application Priority Data

Sep. 7, 2012 (TW) .............................. 101132634 A

(51) Int. Cl.
*H04N 5/232* (2006.01)
*G06F 3/01* (2006.01)
*G06F 3/03* (2006.01)

(52) U.S. Cl.
CPC ......... *H04N 5/23219* (2013.01); *G06F 3/017* (2013.01); *G06F 3/0304* (2013.01); *H04N 5/23212* (2013.01)

(58) Field of Classification Search
CPC ................................................ H04N 5/23219
USPC ....................................................... 348/349
See application file for complete search history.

(56) References Cited

U.S. PATENT DOCUMENTS

| 8,614,669 | B2* | 12/2013 | Marc | 345/158 |
| 2002/0158973 | A1* | 10/2002 | Gomi | 348/240.2 |
| 2007/0147818 | A1* | 6/2007 | Mori | G02B 7/102 396/144 |
| 2008/0159727 | A1* | 7/2008 | Hamamura | G02B 7/102 396/104 |
| 2009/0143671 | A1* | 6/2009 | Ishibashi | A61B 1/00009 600/424 |
| 2010/0321524 | A1* | 12/2010 | Lin | H04N 5/208 348/224.1 |
| 2011/0019067 | A1* | 1/2011 | Matsumoto | H04N 5/23212 348/346 |
| 2011/0090311 | A1* | 4/2011 | Fang et al. | 348/43 |
| 2011/0254861 | A1* | 10/2011 | Emura et al. | 345/633 |
| 2012/0113300 | A1* | 5/2012 | Hamano | G02B 7/346 348/241 |
| 2012/0114182 | A1 | 5/2012 | Liu | |

(Continued)

FOREIGN PATENT DOCUMENTS

| CN | 102253713 A | 11/2011 |
| JP | 02-116418 A | 5/1990 |

(Continued)

*Primary Examiner* — Roberto Velez
*Assistant Examiner* — Cynthia Segura
(74) *Attorney, Agent, or Firm* — Hauptman Ham, LLP

(57) ABSTRACT

A gesture recognition system includes an image capturing device, a memory unit and a processing unit. The image capturing device includes a zoom lens and captures an image frame with a focus length. The memory unit previously saves a lookup table of depths versus sharpness associated with at least one the focus length of the zoom lens. The processing unit is configured to calculate a current sharpness value of at least one object image in the image frame and to obtain a current depth of the object image according to the lookup table.

21 Claims, 4 Drawing Sheets

| object depth | 10cm object d sharpness | 30cm object d sharpness | 50cm object d sharpness | 70cm object d sharpness |
|---|---|---|---|---|
| 10cm | 0.8 | 0.6 | 0.4 | 0.25 |
| 20cm | 0.7 | 0.7 | 0.5 | 0.3 |
| 30cm | 0.6 | 0.8 | 0.6 | 0.4 |
| 40cm | 0.5 | 0.7 | 0.7 | 0.5 |
| 50cm | 0.4 | 0.6 | 0.8 | 0.6 |
| 60cm | 0.3 | 0.5 | 0.7 | 0.7 |
| 70cm | 0.25 | 0.4 | 0.6 | 0.8 |
| 80cm | 0.2 | 0.3 | 0.5 | 0.7 |
| 90cm | 0.15 | 0.25 | 0.4 | 0.6 |

(object d is an abbreviation of object distance)

(56) References Cited

U.S. PATENT DOCUMENTS

| | | | | |
|---|---|---|---|---|
| 2012/0140110 A1* | 6/2012 | Makigaki | ............... | G03B 17/14 |
| | | | | 348/345 |
| 2014/0055566 A1* | 2/2014 | Hsu | ............................... | 348/46 |
| 2015/0124155 A1* | 5/2015 | Li | ......................... | G03B 13/36 |
| | | | | 348/349 |
| 2015/0201121 A1* | 7/2015 | Nobayashi | ............... | G02B 7/34 |
| | | | | 348/222.1 |

FOREIGN PATENT DOCUMENTS

| | | | | |
|---|---|---|---|---|
| JP | EP 0368671 A2 * | 5/1990 | ............... | G06K 9/48 |
| JP | 04-82624 A | 3/1992 | | |
| TW | 201219740 A | 5/2012 | | |
| WO | WO 2009152769 A1 * | 12/2009 | ............... | H04N 7/15 |
| WO | WO 2010073616 A1 * | 7/2010 | ............ | H04N 5/225 |
| WO | 2011101035 A1 | 8/2011 | | |

* cited by examiner

| object depth | 10cm object d sharpness | 30cm object d sharpness | 50cm object d sharpness | 70cm object d sharpness |
|---|---|---|---|---|
| 10cm | 0.8 | 0.6 | 0.4 | 0.25 |
| 20cm | 0.7 | 0.7 | 0.5 | 0.3 |
| 30cm | 0.6 | 0.8 | 0.6 | 0.4 |
| 40cm | 0.5 | 0.7 | 0.7 | 0.5 |
| 50cm | 0.4 | 0.6 | 0.8 | 0.6 |
| 60cm | 0.3 | 0.5 | 0.7 | 0.7 |
| 70cm | 0.25 | 0.4 | 0.6 | 0.8 |
| 80cm | 0.2 | 0.3 | 0.5 | 0.7 |
| 90cm | 0.15 | 0.25 | 0.4 | 0.6 |

(object d is an abbreviation of object distance)

GESTURE RECOGNITION SYSTEM AND GESTURE RECOGNITION METHOD BASED ON SHARPNESS VALUES

CROSS REFERENCE TO RELATED APPLICATION

This application claims the priority benefit of Taiwan Patent Application Serial Number 101132634, filed on Sep. 7, 2012, the full disclosure of which is incorporated herein by reference.

BACKGROUND

1. Field of the Disclosure

This disclosure generally relates to a human machine interface device and, more particularly, to a gesture recognition system and method employing a zoom lens.

2. Description of the Related Art

In recent years, introducing the interactive mechanism into multimedia systems so as to improve the operational convenience has become a popular technique, wherein the gesture recognition is an important technique adapted to replace the traditional mouse, stick or remote controller.

A gesture recognition system generally includes an image sensor and a processing unit, wherein the image sensor is configured to capture images containing an operating object, e.g. a finger; and the processing unit is configured to post-process the images to accordingly control an application.

For example as shown in FIG. 1, an image sensor 91 is configured to capture a plurality of images containing an object O within its focus range FR, and a processing unit 92 is configured to identify a position variation of the object O according to the images. However, the processing unit 92 is not able to identify a depth of the object O according to the images, and when the focus range FR includes another object, e.g. a background object O', the processing unit 92 can not distinguish the objects O and O' such that the control error may occur.

Referring to FIG. 2, in order to identify the depth of the object O, it is able to use an infrared light source 93 to project a pattern, e.g. a chessboard pattern, onto the object O such that the processing unit 92 can identify the depth of the object O according to a size of the pattern in the images captured by the image sensor 91. However, when the pattern is interfered by ambient light sources, the control error may still occur.

Accordingly, the present disclosure further provides a gesture recognition system and method that may recognize a three-dimensional coordinate of an object and interact with an image device according to a coordinate variation of the three-dimensional coordinate.

SUMMARY

The present disclosure provides a gesture recognition system and method that may determine a current depth of at least one object according to a previously constructed lookup table regarding object depths versus sharpness.

The present disclosure further provides a gesture recognition system and method that may remove the object outside a predetermined operable range so as to eliminate the interference from environment objects.

The present disclosure further provides a gesture recognition system and method that may reduce the consumption power of the processing unit in operation by employing sub-sampling technique.

The present disclosure provides a gesture recognition system including a zoom lens, an image sensor, a memory unit and a processing unit. The zoom lens is configured to receive a control signal to accordingly adjust a focus length of the zoom lens. The image sensor is configured to capture an image frame through the zoom lens. The memory unit is configured to previously save a lookup table of depths versus sharpness associated with at least one the focus length corresponding to the control signal. The processing unit is configured to calculate a current sharpness value of at least one object image in the image frame and to obtain a current depth of the object image according to the lookup table.

The present disclosure further provides a gesture recognition method adapted to a gesture recognition system having a zoom lens. The gesture recognition method includes the steps of: constructing and saving a lookup table of depths versus sharpness associated with at least one focus length of the zoom lens; capturing an image frame using an image capturing device with a current focus length; calculating a current sharpness value of at least one object image in the image frame with a processing unit; and obtaining a current depth of the at least one object image according to the current sharpness value as well as the lookup table.

The present disclosure further provides a gesture recognition system including an image capturing device, a memory unit and a processing unit. The image capturing device has a zoom lens and is configured to capture an image frame with a focus length. The memory unit is configured to previously save a lookup table of depths versus sharpness associated with at least one the focus length of the zoom lens. The processing unit is configured to calculate a current sharpness value of at least one object image in the image frame and to obtain a current depth of the object image according to the lookup table.

In one aspect, an operable range may be previously set and saved so that the processing unit may remove the object image outside the operable range accordingly thereby eliminating the interference from environment objects, wherein the operable range may be a sharpness range or a depth range set before shipment or in a setup stage before the system is actually operated.

In one aspect, the processing unit is further configured to perform a sub-sampling process on the image frame before obtaining the current sharpness value so as to reduce the consumption power of the processing unit in operation, wherein a sub-sampled pixel area of the sub-sampling process is at least a 4×4 pixel area.

In the gesture recognition system and method of the present disclosure, the processing unit may calculate a three-dimensional coordinate of the object image according to the image frame captured by the image sensor, wherein the three-dimensional coordinate may include two transverse coordinates and a depth coordinate. The processing unit may further control a display device according to a coordinate variation of the three-dimensional coordinate between a plurality of image frames, e.g. controlling a cursor motion or an application.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
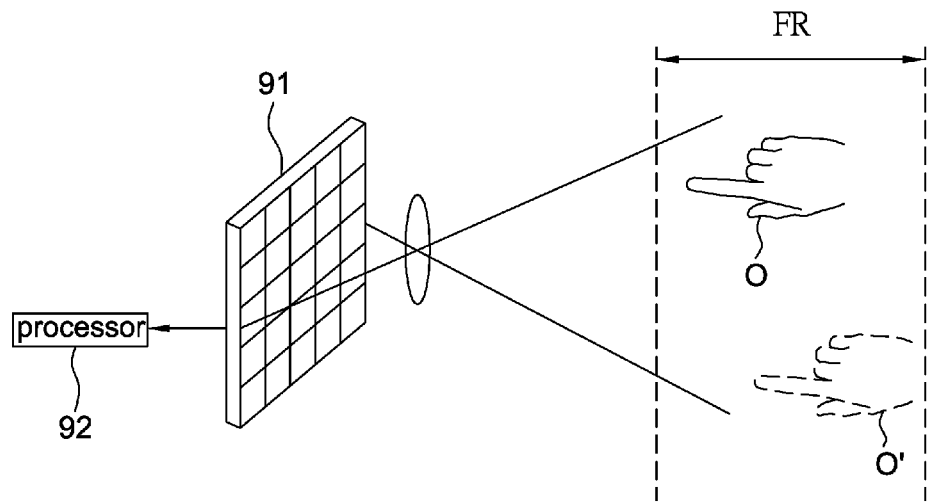
FIG. 1 shows a schematic diagram of the conventional gesture recognition system.
Figure 2:
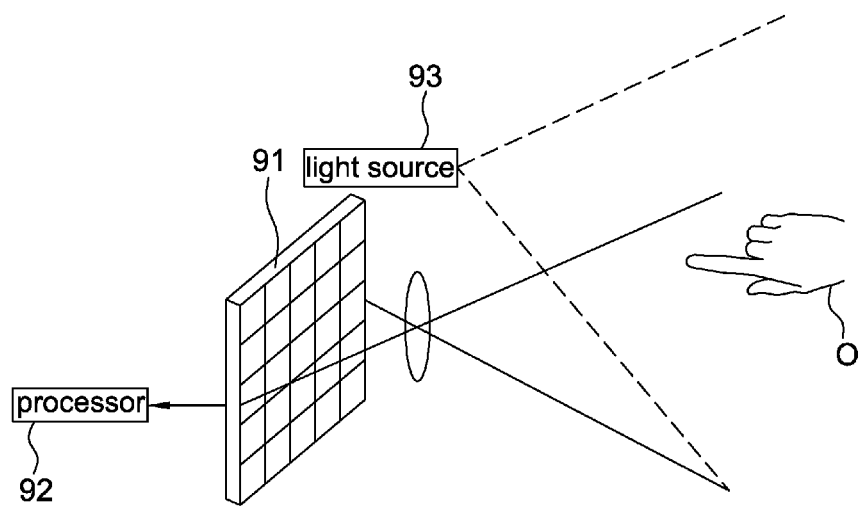
FIG. 2 shows a schematic diagram of another conventional gesture recognition system.
Figures 3, 4:
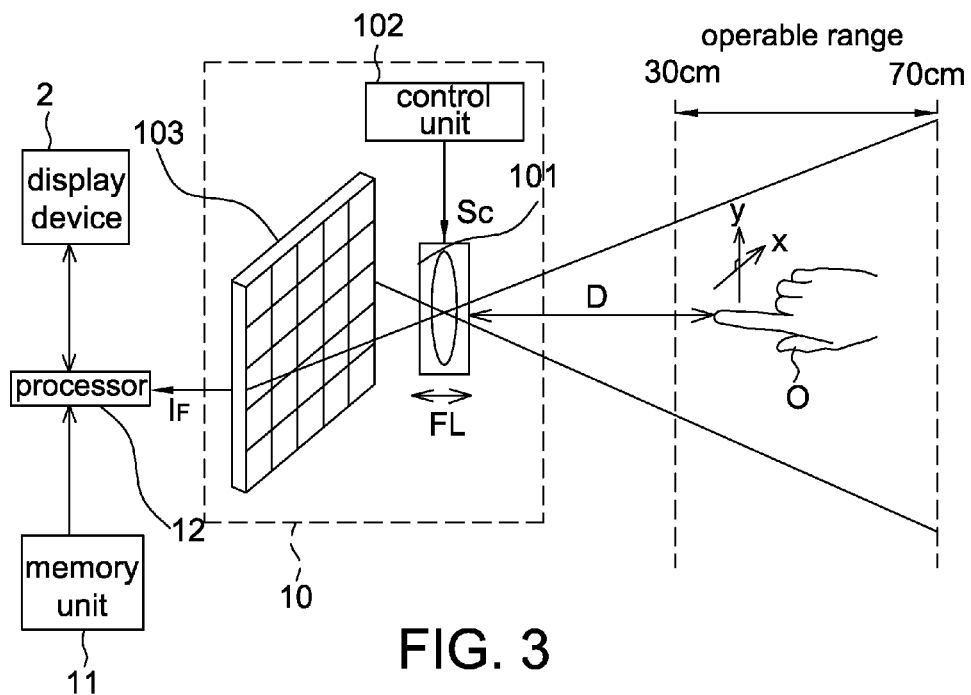
FIG. 3 shows a schematic diagram of the gesture recognition system according to an embodiment of the present disclosure.
FIG. 4 shows a lookup table of the gesture recognition system according to the embodiment of the present disclosure.

Referring to FIG. 3, it shows a schematic diagram of the gesture recognition system according to an embodiment of the present disclosure. The gesture recognition system includes an image capturing device 10, a memory unit 11 and a processing unit 12. The gesture recognition system may be coupled to a display device 2 to interact therewith. The image capturing device 10 includes a zoom lens 101, a control unit 102 and an image sensor 103. The control unit 102 outputs a control signal $S_C$ to the zoom lens 101 so as to change a focus length FL of the zoom lens 101, wherein the control signal $S_C$ may be a voltage signal, a pulse width modulation (PWM) signal, a step motor control signal or other signals adapted to control the zoom lens. In one embodiment, the control unit 102 may be, for example, a voltage control module configured to output different voltage values to the zoom lens 101 for adjusting its focus length FL. The image sensor 103 may be a CCD image sensor, a CMOS image sensor or other sensors for sensing optical energy, and is configured to capture an image of an object O through the zoom lens 101 and output an image frame $I_F$. In other words, in this embodiment the image capturing device 10 may capture images of the object O with a variable focus length FL and outputs the image frame $I_F$; and the zoom lens 101 is adapted to receive a control signal $S_C$ to accordingly adjust a focus length FL of the zoom lens 101. In other embodiments, the zoom lens 101 and the control unit 102 may combine together to form a zoom lens module.

The memory unit 11 previously saves a lookup table of depths versus sharpness associated with at least one focus length FL of the zoom lens 101, wherein said focus length FL is corresponding to the control signal $S_C$, e.g. each voltage value outputted by the control unit 102 corresponds to one focus length FL. For example referring to FIG. 4, it shows a lookup table previously saved in the memory unit 11 of the gesture recognition system according to the embodiment of the present disclosure. Before shipment, it is able to select at least one control signal $S_C$ to be inputted into the zoom lens 101 so as to determine a focus length FL and calculate the depth (i.e. a longitudinal distance with respect to the image capturing device 10) corresponding to sharpness of different object distances at that focus length FL. For example, when the zoom lens 101 is controlled to focus on the object distance of 50 cm, it is able to obtain the highest sharpness value (e.g. 0.8 herein) at the depth of 50 cm, and the sharpness value decreases with the increasing and decreasing of the depth. An embodiment of the sharpness may be indicated by the modulation transfer function (MTF) value, but not limited thereto. Similarly, it is able to control the zoom lens 101 to focus on a plurality of object distances before shipment and respectively construct a lookup table of depths versus sharpness associated with different object distances. For example, FIG. 4 further shows the relationship between depths and sharpness when focusing on the object distance of 10 cm, 30 cm and 70 cm, and this lookup table is previously saved in the memory unit 11. It should be mentioned that values shown in FIG. 4 are only exemplary but not to limit the present disclosure.

In actual operation of the gesture recognition system, the processing unit 12 is configured to calculate a current sharpness value of at least one object image (e.g. the image of the object O) in the image frames $I_F$ and to obtain a current depth D of the object image according to the lookup table. For example, when the image capturing device 10 is focused on the object distance of 10 cm, an image frame $I_F$ is captured and if the processing unit 12 calculates that a sharpness value of an object image in the image frame $I_F$ is 0.8, it means that the current depth D is 10 cm; if the sharpness value is 0.7, it means that the current depth D is 20 cm; if the sharpness value is 0.6, it means that the current depth D is 30 cm and so on. In this manner, the processing unit 12 may obtain a current depth D according to the obtained sharpness value in comparison with the lookup table. In addition, according to FIG. 4, one sharpness value may correspond to two current depths D, e.g. when the image capturing device 10 is focused on the object distance of 50 cm, each sharpness value is corresponded to two depths. Therefore, in order to confirm the correct current depth D, in the present disclosure it is able to control the image capturing device 10 to change the focus length FL (e.g. focusing on the object distance of 30 cm or 70 cm) and further capture an image frame $I_F$ for calculating another current sharpness value of the object image. Accordingly, two current sharpness values may determine a correct current depth D.

In addition, in order to remove the image of background objects, in this embodiment the processing unit 12 may further be configured to remove the object image outside an operable range. Referring to FIG. 3 again, for example an operable range may be previously set as 30-70 cm before shipment and saved in the memory unit 11; or the operable range may be set as 30-70 cm in a setup stage before the gesture recognition system of the present disclosure is actually operated. For example, a switching mode may be provided (e.g. in the starting procedure or by enabling a selection switch) to select the setup stage for setting the operable range to be saved in the memory unit 11. The operable range may be a sharpness range or a depth range. For example when the processing unit 12 calculates a current sharpness value of an object image, the processing unit 12 may determine whether to keep the object image for post-processing directly according to the sharpness range without comparing with the lookup table; or the processing unit 12 may convert the current sharpness value of the object image to a current depth D according to the lookup table and then determine whether to keep the object image for post-processing according to the depth range.

Figure 5:
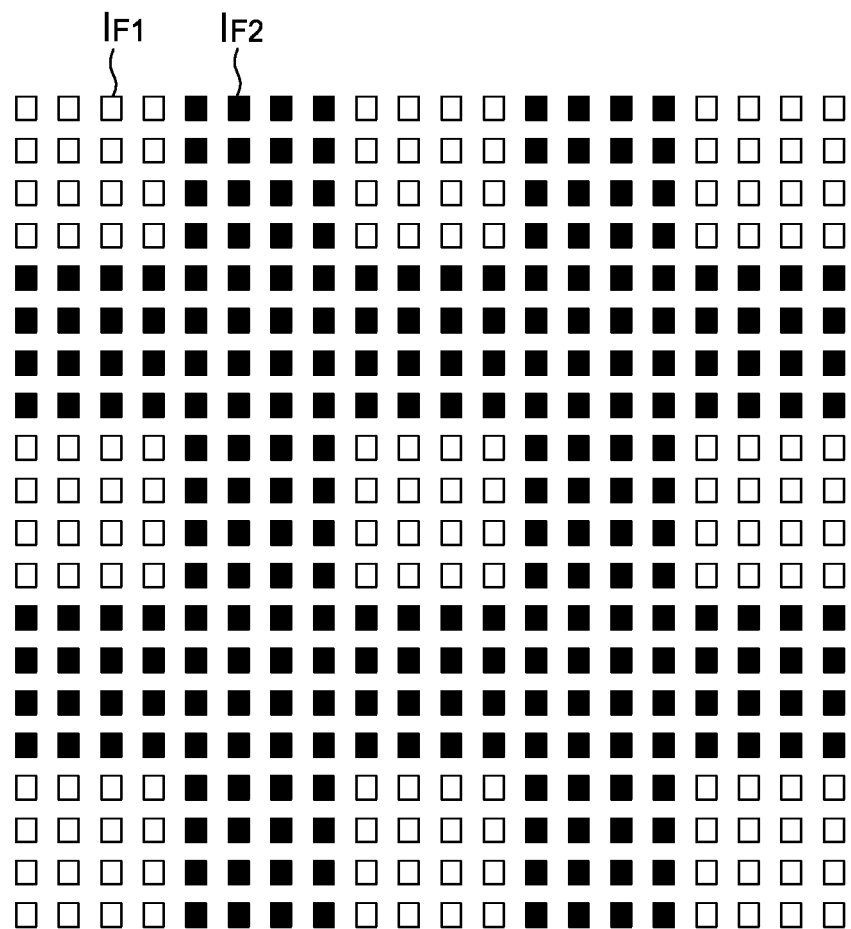
FIG. 5 shows a schematic diagram of the sub-sampling process of the gesture recognition system according to the embodiment of the present disclosure.

In addition, in order to reduce the power consumption of the processing unit 12 in operation, the processing unit 12 may perform a sub-sampling process on the image frame $I_F$ before obtaining the current sharpness value. In this embodiment, as the object depth has to be recognized according to different sharpness values, in order not to loss image information of blurred areas in the sub-sampling process, a sub-sampled pixel area in the sub-sampling process is preferably at least a 4×4 pixel area. For example referring to FIG. 5, the image sensor 103 may capture and output the image frames $I_F$ having a size of 20×20, and the processing unit 12 only retrieves a part of pixel areas in the post-processing process, e.g. the blank pixel areas $I_{F1}$ in FIG. 5 (i.e. sub-sampled pixels) to accordingly calculate the depth of the object image. Filled pixel areas $I_{F2}$ (i.e. not sub-sampled pixels) are abandoned. This is the sub-sampling process referred by the present disclosure. It is appreciated that, according to the size of the image frame $I_F$, a size of the sub-sampled pixel area (i.e. the blank pixel areas $I_{F1}$) may be 4×4, 8×8 and so on as long as it is larger than 4×4 pixel area. In addition, the sub-sampled pixel area in the sub-sampling process may further be dynamically adjusted according to the image quality of the captured images, and this may be realized by changing the timing control of the image sensor.

After the current depth D of the object image has been calculated, the processing unit 12 is able to calculate a three-dimensional coordinate of the object image according to the image frame $I_F$; e.g. calculating a plane coordinate (x, y) according to a transverse position of the object image with respect to the image capturing device 10 and obtaining a three-dimensional coordinate (x, y, D) of the object image further cooperating with the current depth D of the object image with respect to the image capturing device 10. The processing unit 12 may interact with the display device 2 according to a coordinate variation (Δx, Δy, ΔD) of the three-dimensional coordinate (x, y, D), e.g. controlling the cursor motion of a cursor on the display device 2 and/or an application (e.g. the icon selection), but not limited thereto, wherein a gesture may be a simple two-dimensional transverse trace (i.e. horizontal movement) or a one-dimensional longitudinal trace (i.e. movement along the depth with respect to the image capturing device 10), or a three-dimensional trace, and various combinations are possible according to the user definition. Particularly, as the present embodiment may detect three-dimensional movement information of an object, the gesture motion may be defined by three-dimensional information so that more complicated and various gesture commands can be implemented.

Figure 6:
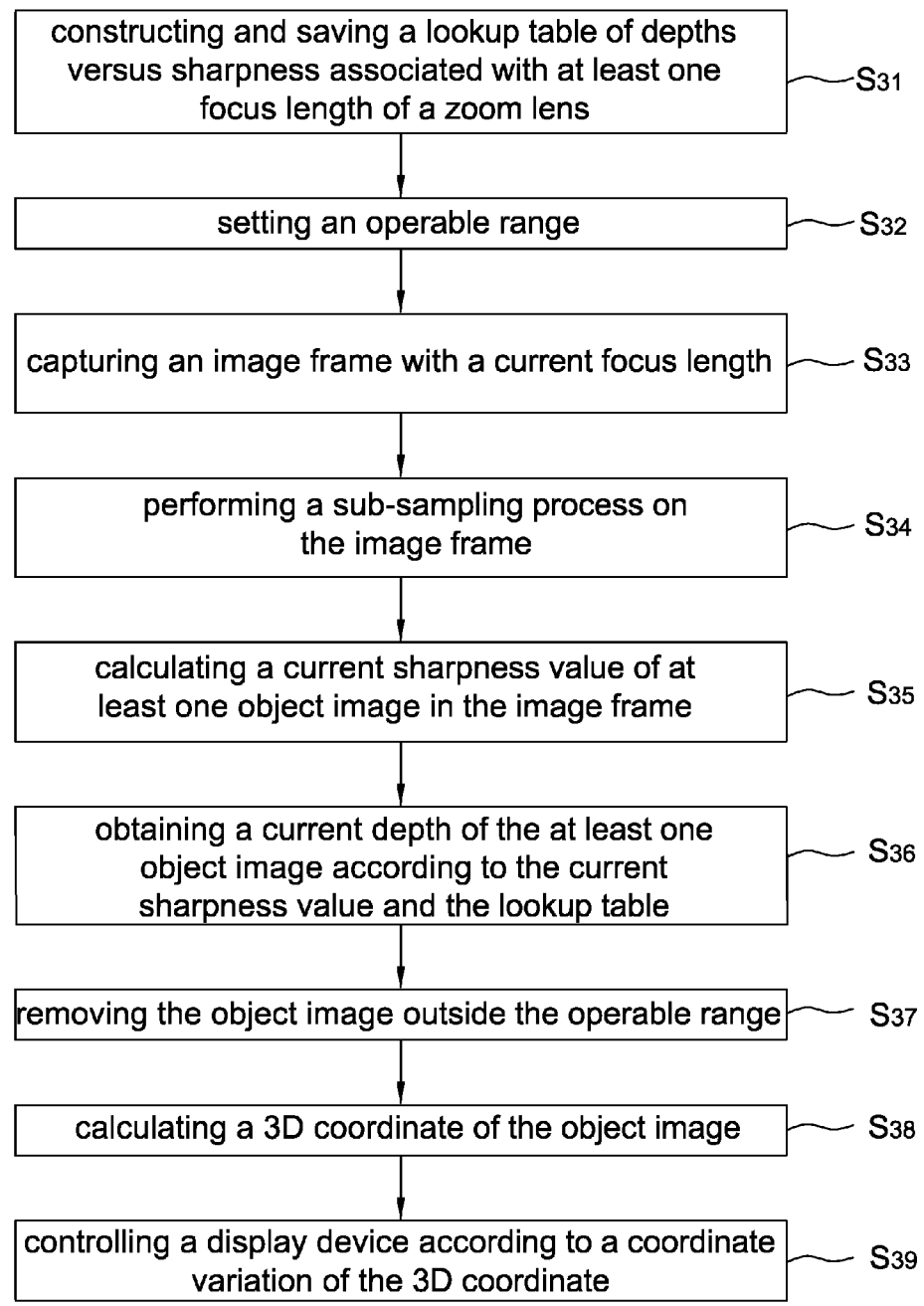
FIG. 6 shows a flow chart of the gesture recognition method according to an embodiment of the present disclosure.

Referring to FIG. 6, it shows a flow chart of the gesture recognition method according to an embodiment of the present disclosure, which includes the steps of: constructing and saving a lookup table of depths versus sharpness associated with at least one focus length of a zoom lens (Step $S_{31}$); setting an operable range (Step $S_{32}$); capturing an image frame with a current focus length (Step $S_{33}$); performing a sub-sampling process on the image frame (Step $S_{34}$); calculating a current sharpness value of at least one object image in the image frame (Step $S_{35}$); obtaining a current depth of the at least one object image according to the current sharpness value and the lookup table (Step $S_{36}$); removing the object image outside the operable range (Step $S_{37}$); calculating a three-dimensional coordinate of the object image (Step $S_{38}$); and controlling a display device according to a coordinate variation of the three-dimensional coordinate (Step $S_{39}$). The gesture recognition method according to the embodiment of the present disclosure may be adapted to a gesture recognition system having a zoom lens 101.

Referring to FIGS. 3 to 6, details of the gesture recognition method of this embodiment are described hereinafter.

Step $S_{31}$: Preferably, before shipment of the gesture recognition system, a lookup table of depths verses sharpness associated with at least one focus length FL of the zoom lens 101 is previously constructed (as shown in FIG. 4). The lookup table is stored in the memory unit 11 to be served as the lookup reference in actual operation.

Step $S_{32}$: Next, an operable range is set, and the operable range may be determined according to different applications of the gesture recognition system. In one embodiment, the operable range may be set before shipment of the gesture recognition system. In another embodiment, the operable range may be set by a user in a setup stage before the actual operation; i.e. the operable range may be set according to the requirement of user. As mentioned above, the operable range may be a sharpness range or a depth range. In other embodiments, if the gesture recognition system is operated in an environment without the interference from the environment object, the Step $S_{32}$ may not be implemented.

Step $S_{33}$: In the actual operation, the image capturing device 10 captures an image frame $I_F$ with a current focus length FL and the image frame $I_F$ is outputted to the processing unit 12. A size of the image frame $I_F$ may be determined according to different sizes of a sensing array of the image sensor 103.

Step $S_{34}$: After receiving the image frame $I_F$ and before calculating a current sharpness value of the object image, the processing unit 12 may selectively perform a sub-sampling process on the image frame $I_F$ so as to reduce the power consumption. As mentioned above, a size of a sub-sampled pixel area of the sub-sampling process is at least 4×4 and the size of the sub-sampled pixel area may be determined according to the size and/or the image quality of the image frame $I_F$. In other embodiments, Step $S_{34}$ may not be implemented.

Step $S_{35}$: The processing unit 12 calculates a current sharpness value of at least one object image in the image frame $I_F$ according to the image frame $I_F$ or the sub-sampled image frame, wherein the method of calculating the sharpness value of an object image in the image frame is well known, e.g. calculating the modulation transfer function (MTF) value of the image frame, and thus details thereof are not described herein.

Step $S_{36}$: The processing unit 12 then compares the current sharpness value with the lookup table so as to obtain a current depth D of the at least one object image, e.g. a depth of the object O, corresponding to the current sharpness value. In addition, when the current sharpness value is not included in the lookup table, the corresponded current depth D may be obtained by using the interpolation technique.

Step $S_{37}$: In order to eliminate the interference on the gesture recognition system from environment objects, after obtaining the current depth D of every object image, the processing unit 12 may identify whether the current depth D is within the operable range or not and may remove the object image outside the operable range. It is appreciated that when the Step $S_{32}$ is not implemented, the Step $S_{37}$ is neither implemented.

Step $S_{38}$: Next, the processing unit 12 may calculate a three-dimensional coordinate of each object image within the operable rage according to the image frame $I_F$, e.g. including two transverse coordinates and a depth coordinate (i.e. the current depth D obtained in the Step $S_{36}$), wherein the method of calculating the transverse coordinates by the processing unit 12 is well known and thus details thereof are not described herein. The present embodiment is to correctly calculate the depth of the object O with respect to the image capturing device 10.

Step $S_{39}$: Finally, the processing unit 12 may control a display device 2 according to a coordinate variation of the three-dimensional coordinate between a plurality of the image frames $I_F$, e.g. controlling a cursor motion and/or an application, wherein the display device 2 may be a television, a projection screen, a computer screen, a game host screen or other display devices configured to display/project images.

After the three-dimensional coordinate has been calculated, the gesture recognition system of this embodiment returns to the Step $S_{33}$ to capture a new image frame $I_F$ and then identifies following positions of the object O.

As mentioned above, the conventional gesture recognition method has the problem of unable to recognize the object depth or has the requirement of projecting an additional optical pattern. Therefore, the present disclosure further provides a gesture recognition system (FIG. 3) and a gesture recognition method (FIG. 6) that may achieve the object of recognizing the object depth by employing a zoom lens in cooperation with a previously constructed lookup table (FIG. 4).

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A gesture recognition system, comprising:
a zoom lens configured to adjust a focus length thereof in response to a control signal;
an image sensor configured to capture an image frame through the zoom lens;
a memory unit configured to previously save, in association with at least one focus length corresponding to the control signal, a lookup table of a plurality of depths of an object from the image sensor versus a plurality of sharpness values, each of the sharpness values at one of the depths; and
a processing unit configured to
calculate a current sharpness value of at least one object image in the captured image frame according to the captured image frame, and
obtain a current depth of at least one object captured by the image sensor and associated with the at least one object image according to the lookup table.

2. The gesture recognition system as claimed in claim 1, wherein the processing unit is further configured to remove the object image outside an operable range.

3. The gesture recognition system as claimed in claim 2, wherein the operable range is a sharpness range or a depth range set previously before shipment or in a setup stage before operation.

4. The gesture recognition system as claimed in claim 1, wherein the control signal is a voltage signal or a PWM signal.

5. The gesture recognition system as claimed in claim 1, wherein the processing unit is further configured to perform a sub-sampling process before obtaining the current sharpness value.

6. The gesture recognition system as claimed in claim 5, wherein a sub-sampled pixel area of the sub-sampling process is at least a 4×4 pixel area.

7. The gesture recognition system as claimed in claim 1, wherein the processing unit is further configured to calculate a three-dimensional coordinate of the object image according to the captured image frame.

8. The gesture recognition system as claimed in claim 7, wherein the processing unit is further configured to control a display device according to a coordinate variation of the three-dimensional coordinate.

9. The gesture recognition system as claimed in claim 1, wherein
the sharpness values and the current sharpness value are modulation transfer function values, and
among the plurality of sharpness values versus the plurality of depths associated with one focus length, the sharpness value at a depth equal to the one focus length is the highest value.

10. A gesture recognition method, adapted to a gesture recognition system comprising a zoom lens, the gesture recognition method comprising:
constructing, in association with at least one focus length of the zoom lens, a lookup table of a plurality of depths of an object from the gesture recognition system versus a plurality of sharpness values, each of the sharpness values at one of the depths;
capturing an image frame using an image sensor through the zoom lens with a current focus length;
calculating, by a processing unit, a current sharpness value of at least one object image in the captured image frame according to the captured image frame; and
obtaining, by the processing unit, a current depth of at least one object captured by the image sensor and associated with the at least one object image according to the current sharpness value and the lookup table.

11. The gesture recognition method as claimed in claim 10, further comprising: setting an operable range.

12. The gesture recognition method as claimed in claim 11, further comprising: removing the object image outside the operable range.

13. The gesture recognition method as claimed in claim 11, wherein the operable range is a sharpness range or a depth range.

14. The gesture recognition method as claimed in claim 10, further comprising, before said calculating the current sharpness value:
performing, using the processing unit, a sub-sampling process on the captured image frame,
wherein a sub-sampled pixel area of the sub-sampling process is at least a 4×4 pixel area.

15. The gesture recognition method as claimed in claim 10, further comprising:
calculating, using the processing unit, a three-dimensional coordinate of the object image according to the captured image frame.

16. The gesture recognition method as claimed in claim 15, further comprising:
controlling, using the processing unit, a display device according to a coordinate variation of the three-dimensional coordinate.

17. A gesture recognition system, comprising:
an image capturing device comprising a zoom lens and configured to capture an image frame at a focus length of the zoom lens;
a memory unit configured to previously save, in association with at least one focus length of the zoom lens, a lookup table of a plurality of depths of an object from the image capturing device versus a plurality of sharpness values, each of the sharpness values at one of the depths; and
a processing unit configured to
calculate a current sharpness value of at least one object image in the captured image frame according to the captured image frame, and obtain a current depth of at least one object captured by the image capturing device and associated with the at least one object image according to the lookup table.

18. The gesture recognition system as claimed in claim 17, wherein the processing unit is further configured to remove the object image outside an operable range.

19. The gesture recognition system as claimed in claim 18, wherein the operable range is a sharpness range or a depth range.

20. The gesture recognition system as claimed in claim 17, wherein the processing unit is further configured to perform a sub-sampling process before obtaining the current sharpness value, and a sub-sampled pixel area of the sub-sampling process is at least a 4×4 pixel area.

21. The gesture recognition system as claimed in claim 17, wherein the processing unit is further configured to calculate a three-dimensional coordinate of the object image according to the captured image frame to accordingly control at least one of a cursor motion and an application.

* * * * *